United States Patent
Huang et al.

(10) Patent No.: US 9,256,324 B2
(45) Date of Patent: Feb. 9, 2016

(54) INTERACTIVE OPERATION METHOD OF ELECTRONIC APPARATUS

(71) Applicant: National Taiwan University of Science and Technology, Taipei (TW)

(72) Inventors: Bai-Ruei Huang, New Taipei (TW); Chang-Hong Lin, Taipei (TW); Chia-Han Lee, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 175 days.

(21) Appl. No.: 14/133,650

(22) Filed: Dec. 19, 2013

(65) Prior Publication Data

US 2015/0097812 A1    Apr. 9, 2015

(30) Foreign Application Priority Data

Oct. 8, 2013 (TW) .................................. 102136408

(51) Int. Cl.
G06F 3/042    (2006.01)
G06F 3/0346   (2013.01)

(52) U.S. Cl.
CPC ............ *G06F 3/0425* (2013.01); *G06F 3/0346* (2013.01); *G06F 2203/04101* (2013.01); *G06F 2203/04108* (2013.01)

(58) Field of Classification Search
None
See application file for complete search history.

(56) References Cited

U.S. PATENT DOCUMENTS

| 8,303,411 | B2 | 11/2012 | Marks et al. |
| 8,395,600 | B2 * | 3/2013 | Kawashima et al. ......... 345/175 |
| 2009/0077504 | A1 * | 3/2009 | Bell et al. ...................... 715/863 |
| 2012/0309532 | A1 | 12/2012 | Ambrus et al. |
| 2013/0237811 | A1 | 9/2013 | Mihailescu et al. |
| 2013/0257751 | A1 | 10/2013 | Stafford |

FOREIGN PATENT DOCUMENTS

| TW | 200949617 | 12/2009 |
| TW | 201019241 | 5/2010 |
| TW | 201120681 | 6/2011 |
| TW | 201228332 | 7/2012 |
| WO | WO 2013035554 A1 * | 3/2013 |
| WO | WO 2014001058 A1 * | 1/2014 |

OTHER PUBLICATIONS

"Office Action of Taiwan Counterpart Application", issued on Mar. 30, 2015, p. 1-p. 5, in which the listed references were cited.

(Continued)

*Primary Examiner* — Gerald Johnson
*Assistant Examiner* — Maheen Javed
(74) *Attorney, Agent, or Firm* — Jianq Chyun IP Office

(57) ABSTRACT

An interactive operation method of an electronic apparatus is provided. An image sequence is captured by an image capturing unit. An image pre-processing is executed on an image of the image sequence. A fingertip candidate region is obtained from the image. Whether the fingertip candidate region is connected with a hand region is determined. If the fingertip candidate region is connected with the hand region, the fingertip candidate region serves as a target fingertip region. Whether a click event occurs is determined by continuously tracking the target fingertip region. When the click event occurs, a corresponding function is executed.

9 Claims, 6 Drawing Sheets

(56) References Cited

OTHER PUBLICATIONS

Lo, "The Utilization of Fingertip Detection and Tracking with Augmented Reality," Master's thesis, Jul. 24, 2012, Department of Information Technology and Management, Shih Chien University.

Li, "A Real Time Hand Gesture Recognition System for Set-top Box Control," Master's thesis, Dec. 1999, Department of Computer Science and Information Engineering, National Central University.

* cited by examiner

INTERACTIVE OPERATION METHOD OF ELECTRONIC APPARATUS

CROSS-REFERENCE TO RELATED APPLICATION

This application claims the priority benefit of Taiwan application serial no. 102136408, filed on Oct. 8, 2013. The entirety of the above-mentioned patent application is hereby incorporated by reference herein and made a part of this specification.

BACKGROUND OF THE INVENTION

1. Field of the Invention

The invention relates to an interactive control mechanism and more particularly relates to an interactive operation method based on gesture identification.

2. Description of Related Art

As electronic apparatuses develop in the recent years, electronic products such as smart phones, tablet computers, etc., become more and more popular. People start to pay more attention to issues such as the quality and capability that electronic apparatuses provide the user. For example, some electronic apparatuses may provide a human machine interface (HMI) to help achieve the interaction between the user and the electronic apparatuses. The design of the human machine interface is determined by the demand and habit of the user. For instance, physical controllers, such as mice, keyboards, and remote controls, are common human machine interfaces at present.

Through these physical controllers, the user is able to operate electronic apparatuses like computers or televisions. As human machine interface advances, physical controllers are gradually replaced by virtual controllers. Virtual controllers not only create a whole new experience for the user but also have many advantages. First, virtual controllers provide various ways of input. That is, the user may switch between the physical controller and the virtual controller to select a suitable input method according to the user's needs. In addition, the size and shape of the virtual controller may be varied to meet the user's requirements, and the virtual controller does not occupy any physical space.

Augmented reality (or abbreviated as AR) is a technique that calculates the position and angle of an image of a camera in real time and adds corresponding figures. The purpose of such a technique is to integrate the virtual world with the real world on a screen to achieve interaction. The current AR systems are mostly based on network cameras. Nevertheless, cameras of this type can only capture two-dimensional (2D) data. Using limited two-dimensional data to carry out positioning in a three-dimensional space requires highly advanced algorithms. However, the obtained results may not always be accurate. As a result, virtual controllers may not successfully interpret the user's intention and order.

SUMMARY OF THE INVENTION

The invention provides an interactive operation method for detecting a finger of a user and thereby allowing the user to transmit a command with the finger to achieve interaction with an electronic apparatus.

The interactive operation method of the electronic apparatus of the invention includes: capturing an image sequence by an image capturing unit; executing an image pre-processing on an image of the image sequence; obtaining a fingertip candidate region from the image; determining whether the fingertip candidate region is connected with a hand region; designating the fingertip candidate region as a target fingertip region if the fingertip candidate region is connected with the hand region; determining whether a click event occurs by continuously tracking the target fingertip region; and executing a corresponding function in the electronic apparatus when the click event occurs.

In an embodiment of the invention, the step of determining whether the fingertip candidate region is connected with the hand region includes: obtaining a center point of the fingertip candidate region as a reference point; obtaining a first side point, a second side point, a third side point, and a fourth side point respectively in four directions of the reference point, wherein the first side point, the second side point, the third side point, and the fourth side point are located outside the fingertip candidate region; obtaining a first depth value, a second depth value, a third depth value, and a fourth depth value of the first side point, the second side point, the third side point, and the fourth side point respectively from depth information of the image; and determining whether the first depth value, the second depth value, the third depth value, and the fourth depth value are larger than 0; determining that the fingertip candidate region is connected with the hand region in a situation that only one of the first depth value, the second depth value, the third depth value, and the fourth depth value is larger than 0; and determining that the fingertip candidate region is not connected with the hand region in other situations.

In an embodiment of the invention, the interactive operation method further includes: obtaining a first tracking point in the target fingertip region of the image that is currently received; determining whether a display position in a display unit, which corresponds to the first tracking point, is at a position of a function item; and if the display position corresponding to the first tracking point is at the position of the function item, obtaining a second tracking point in the target fingertip region of the image that is previously received; and comparing the first tracking point and the second tracking point to determine whether the click event occurs.

In an embodiment of the invention, the step of comparing the first tracking point and the second tracking point to determine whether the click event occurs includes: comparing the first tracking point and the second tracking point to obtain a displacement in a vertical axis; comparing the first tracking point and the second tracking point to obtain a displacement in a horizontal axis; comparing the first tracking point and the second tracking point to obtain a depth variation according to depth information; determining that the click event occurs if the displacement in the vertical axis is less than a first predetermined value, the displacement in the horizontal axis is less than a second predetermined value, and the depth variation is less than a third predetermined value; and determining that the click event does not occur if at least one of the following three conditions exists, namely, the displacement in the vertical axis is larger than or equal to the first predetermined value, the displacement in the horizontal axis is larger than or equal to the second predetermined value, and the depth variation is larger than or equal to the third predetermined value.

In an embodiment of the invention, the step of determining whether the click event occurs further includes: obtaining a first calculation point and a second calculation point in the target fingertip region of the image that is currently received based on the first tracking point, wherein the first tracking point is located between the first calculation point and the second calculation point; calculating a depth difference between the first calculation point and the second calculation point according to the depth information; in a situation that the displacement in the vertical axis is less than the first predetermined value, the displacement in the horizontal axis is less than the second predetermined value, and the depth variation is less than the third predetermined value, determining that the click event occurs if the depth difference is larger than or equal to a fourth predetermined value; and determining that the click event does not occur if the depth difference is less than the fourth predetermined value.

In an embodiment of the invention, the interactive operation method further includes: displaying an augmented reality interactive interface in a display unit; displaying the image that is received in the augmented reality interactive interface; displaying a first virtual layer in the augmented reality interactive interface when obtaining a target face region in the image, wherein the first virtual layer comprises a function item; and displaying a second virtual layer in the augmented reality interactive interface when the function item is triggered, wherein the second virtual layer comprises a virtual control interface.

In an embodiment of the invention, the step of executing the image pre-processing includes: executing a background removal process. The background removal process includes: detecting a plurality of pending objects in the image; and excluding one or a plurality of uninterested objects from the plurality of pending objects according to depth information of the image, wherein a depth value of the one or the plurality of uninterested objects is larger than a predetermined depth value. That is, the pending objects having depth values less than the predetermined depth value are retained.

In an embodiment of the invention, after the step of executing the background removal process, the interactive operation method further includes executing a face pose estimation process. The face pose estimation process includes: executing a face detection process on the remaining pending objects to obtain a plurality of face regions; obtaining a target face region from the plurality of face regions according to the depth information of the image, wherein the target face region has the minimum depth value among the depth values of the face regions (i.e. the one closest to the image capturing unit); and retaining one of the pending objects located in the target face region that has the minimum depth value and excluding the other pending objects.

In an embodiment of the invention, after the step of executing the face pose estimation process, the interactive operation method further includes executing a hand detection process. The hand detection process includes: obtaining the hand region by a skin color detection algorithm.

In an embodiment of the invention, after the step of executing the hand detection process, the interactive operation method further includes executing a fingertip detection process to obtain the fingertip candidate region.

Based on the above, the finger with which the user performs an operation in the three-dimensional space is detected, and whereby when it is detected that the finger triggers the click event, the corresponding function in the electronic apparatus is executed. Accordingly, the user is able to interact with the electronic apparatus by transmitting a command through the finger.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

As technology advances, people start to pay more attention to issues, such as the functions that an electronic apparatus can provide the user and quality of the equipment. The invention provides an interactive operation method of an electronic apparatus, by which the user is able to transmit a command with a finger in a three-dimensional space to control the electronic apparatus. In order to make this disclosure of the invention more comprehensible, embodiments are described below as examples to prove that the invention can actually be realized.

Figure 1:
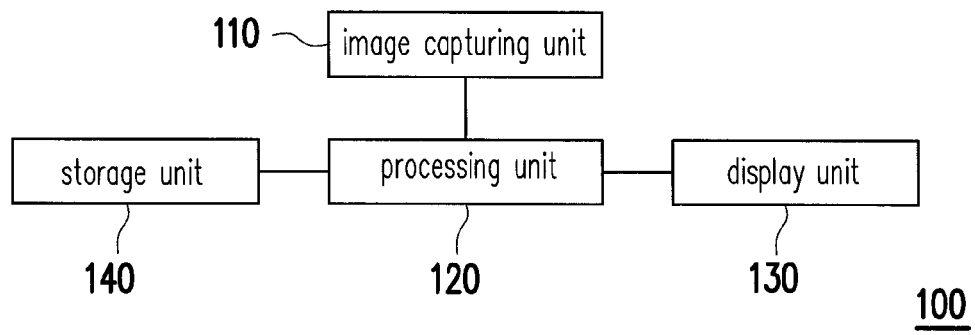
FIG. 1 is a block diagram showing an electronic apparatus according to an embodiment of the invention.

FIG. 1 is a block diagram showing an electronic apparatus according to an embodiment of the invention. With reference to FIG. 1, an electronic apparatus 100 includes an image capturing unit 110, a processing unit 120, a display unit 130, and a storage unit 140. The processing unit 120 is coupled to the image capturing unit 110, the display unit 130, and the storage unit 140. The image capturing unit 110 is used to capture an image of the user, and an action of the user in the image is identified by the processing unit 120, so as to execute a corresponding function in the electronic apparatus 100. Details of each of the elements are provided below.

The image capturing unit 110 is configured to capture the image. The image capturing unit 110 may be a depth camera or a stereo camera, or any video camera or camera that has a CCD (charge coupled device) lens, a CMOS (complementary metal oxide semiconductor transistors) lens, or an infrared lens, etc., for example. A direction to which the image capturing unit 110 faces is a direction that the image capturing unit 110 can easily capture the image of the user.

The processing unit 120 is configured to analyze the image captured by the image capturing unit 110. The processing unit 120 is a central processing unit (CPU), a programmable microprocessor for general or special use, a digital signal processor (DSP), a programmable controller, an application specific integrated circuit (ASIC), a programmable logic device (PLD), a field-programmable gate array (FPGA), other similar devices, or a combination of these devices, for example.

The display unit 130 may be a display of any type, such as a flat panel display (e.g. liquid crystal display (LCD) or light emitting diode (LED)), a projection display, or a soft display, etc.

The storage unit 140 is a fixed or movable random access memory (RAM) in any form, a read-only memory (ROM), a flash memory, a hard disc, other similar devices, or a combination of these devices, for example. The storage unit 140 is used to record a plurality of modules that may be executed by the processing unit 120 for achieving the interactive operation method.

This embodiment is realized by a code. For example, the storage unit 140 stores a plurality of code snippets therein. The code snippets are executed by the processing unit 120 after being installed. Accordingly, the electronic apparatus 100 is capable of detecting the finger of the user accurately in a complicated natural environment, whereby the user is able to transmit a command with the finger to interact with a machine. Steps of detecting the finger to control the electronic apparatus 100 are explained below.

Figure 2:
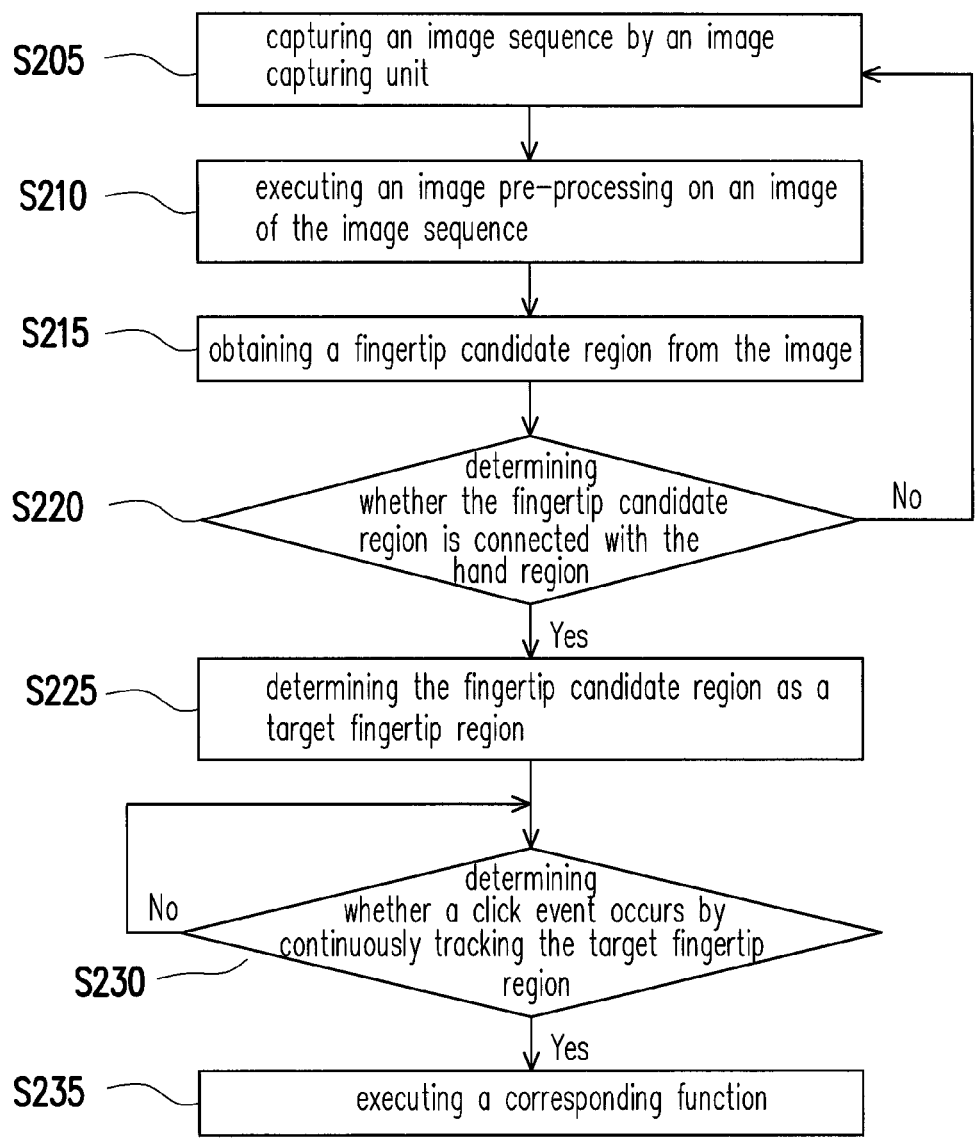
FIG. 2 is a flowchart illustrating an interactive operation method according to an embodiment of the invention.

FIG. 2 is a flowchart illustrating an interactive operation method according to an embodiment of the invention. With reference to FIG. 1 and FIG. 2, in Step S205, an image sequence is captured by the image capturing unit 110. For example, the image capturing unit 110 captures an image at a sampling frequency. Next, in Step S210, the processing unit 120 executes an image pre-processing on the image in the image sequence. The image pre-processing includes a background removal process, a face pose estimation process, a hand detection process, etc. After obtaining a hand region, in Step S215, the processing unit 120 obtains a fingertip candidate region from the image. That is to say, a possible region of a fingertip is found from the hand region.

Then, in Step S220, the processing unit 120 determines whether the fingertip candidate region is connected with the hand region. In a normal human body structure, a side of the fingertip is connected with other parts of the hand. Therefore, the correct fingertip region is found by determining whether the fingertip candidate region is connected with the hand region. If the fingertip candidate region is connected with the hand region, in Step S220, the processing unit 120 determines the fingertip candidate region as a target fingertip region. If the fingertip candidate region is not connected with the hand region, it indicates that the fingertip is not present in the currently received image. In that case, the method moves back to Step S205 to continue to receive the next image from the image capturing unit 110.

After obtaining the target fingertip region, in Step S230, the processing unit 120 determines whether a click event occurs by continuously tracking the target fingertip region in the image sequence. That is, whether the user executes a specific gesture in the three-dimensional space is detected so as to drive a function of the electronic apparatus 100. When detecting the specific gesture, namely, detecting that the click event occurs, in Step S235, the processing unit 120 executes the corresponding function. On the other hand, if occurrence of the click event is not detected, Step S230 is executed. For example, an image is displayed by the display unit 130, and when the user executes a click gesture at a position of the three-dimensional space corresponding to a function item in the image, the processing unit 120 determines that the click event occurs at this position by analyzing the image captured by the image capturing unit 110, thereby executing this function item accordingly.

Another example is described below to illustrate the steps of the aforementioned method. However, it should be noted that the following embodiment is merely one of the examples, and the invention is not limited thereto.

Figure 3:
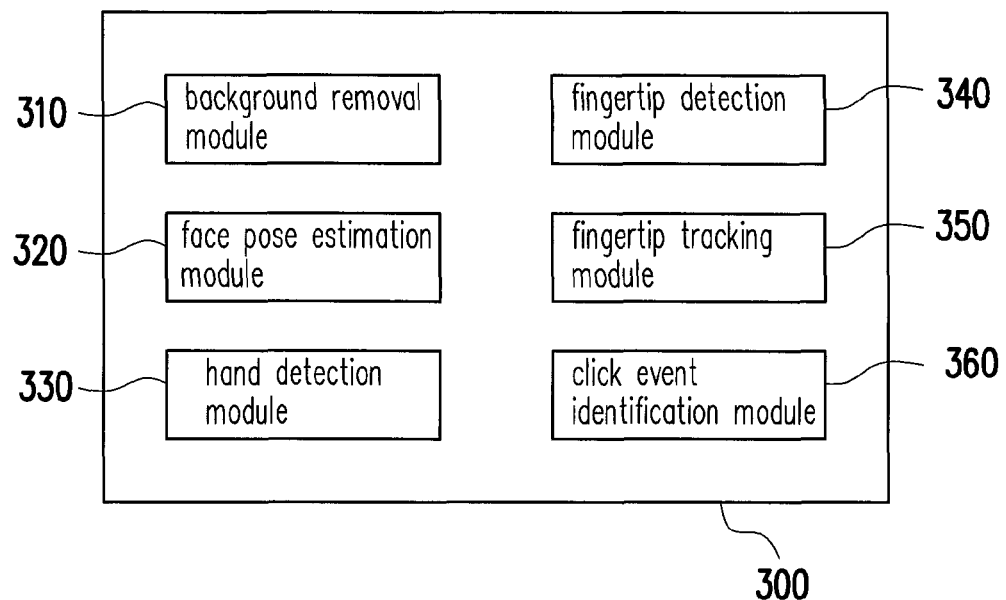
FIG. 3 is a schematic diagram of an image processing module according to an embodiment of the invention.

FIG. 3 is a schematic diagram of an image processing module according to an embodiment of the invention. In this embodiment, an image processing module 300 is computer software constructed based on code snippets, which is stored in the storage unit 140 to be executed by the processing unit 120. However, in other embodiments, the image processing module 300 may be hardware formed by various chips, which is coupled to the processing unit 120 to be driven and executed by the processing unit 120. The disclosure here is not intended to limit the way the image processing module 300 of the invention is realized. The image processing module 300 includes a background removal module 310, a face pose estimation module 320, a hand detection module 330, a fingertip detection module 340, a fingertip tracking module 350, and a click event identification module 360.

The background removal module 310 executes the background removal process, so as to remove a background and retain a region where the user most likely exists. More specifically, the region where a human body exists may be obtained by a background subtraction method. For example, a background image without the user may be established in the electronic apparatus 100 in advance. Then, subtraction is performed on the image captured by the image capturing unit 110 and the background image to obtain a discrepant region between the two images.

The face pose estimation module 320 executes the face pose estimation process, so as to perform face detection and face tracking on the image outputted by the background removal module 310. After obtaining the image with the background removed, the face pose estimation module 320 determines whether a face exists in the image. For example, an adaptive boosting (AdaBoost) learning algorithm based on Haar-like characteristics may be used to identify the face in the image to obtain a face region.

After detecting the face region, the face pose estimation module 320 further utilizes a continuously adaptive mean-shift (Camshift) algorithm to continuously track a position of the face. The Camshift algorithm is for tracking according to a color of a moving object (e.g. the face region). Therefore, no matter how the user moves or turns his/her head, the position of the face of the user can still be obtained by using the Camshift algorithm.

The hand detection module 330 executes the hand detection process, which utilizes a skin color detection algorithm to detect the hand region in the image. An operation of detecting the hand region may be further divided into three parts, i.e. body mask, skin color detection, and image enhancement, for example. In order to find the face and the human body, after detecting the face region, the hand detection module 330 uses the body mask to cover the face region and a body region in the image. Depth values of the body and the face are substantially the same. Therefore, the size of the body mask and the covered region may be automatically varied according to a depth value of the detected face region.

After obtaining the body region, the hand detection module 330 further executes the skin color detection algorithm. For example, first, the following Equation (1) is used to convert the image from RGB color space to YCbCr color space. In the YCbCr color space, Y represents image luminance while Cb and Cr respectively represent image chrominance.

$$\begin{bmatrix} Y \\ Cr \\ Cb \end{bmatrix} = \begin{bmatrix} 0.257 & 0.504 & 0.098 \\ -0.148 & -0.291 & 0.439 \\ 0.439 & -0.368 & -0.071 \end{bmatrix} \begin{bmatrix} R \\ G \\ B \end{bmatrix} + \begin{bmatrix} 16 \\ 128 \\ 128 \end{bmatrix} \quad (1)$$

After converting the color space, the following Equation (2) is used to divide pixels into skin color and non-skin color. That is, a pixel is determined as a skin color pixel if a Cr value is in a range of 133-173 and a Cb value is in a range of 77-127. Any pixel that does not meet the aforementioned is determined as a non-skin color pixel.

$$\text{Skin} = \begin{cases} 1, & \begin{cases} 133 \le Cr \le 173 \\ 77 \le Cb \le 127 \end{cases} \\ 0, & \text{otherwise} \end{cases} \quad (2)$$

After executing the skin color detection algorithm, an image enhancement algorithm is further executed to remove noise. For example, the noise may be removed by a closing operation or an opening operation of morphology. Thereafter, a Gaussian blur filter is used to remove the remaining noise so as to smoothen the shape.

Figure 4:
FIG. 4 is a schematic diagram of an image with a hand region therein according to an embodiment of the invention.

For example, FIG. 4 is a schematic diagram of an image with a hand region therein according to an embodiment of the invention. With reference to FIG. 4, after an image 400 is processed by the background removal module 310, the face pose estimation module 320, and the hand detection module 330, a hand region 401 is obtained.

The fingertip detection module 340 executes a fingertip detection process to find the correct fingertip region in the hand region. More specifically, after obtaining the hand region, a fingertip in the hand region is detected based on a defined fingertip property, whereby a non-fingertip region is excluded. Here, properties of an actual finger may be defined so as to define the fingertip property in advance. The fingertip property includes: a tree-like branch between the hand and the fingertip; and a side of the fingertip being connected with the hand.

The fingertip detection module 340 may perform erosion and then dilation by the opening operation of morphology. That is, erosion is first performed on the image to reduce the region and then dilation is performed on the image to expand the region; or erosion is repeated until all the noise, such as undesired points or lines, is eliminated and then dilation is performed to recover the original figure. After such processes, noise points are removed. In order to skip a palm part, the opening operation is performed with a 6×6 cross-shaped structuring element. A first image is obtained after the opening operation. After subtracting the first image from the original image, a fingertip candidate region is obtained.

Figure 5:
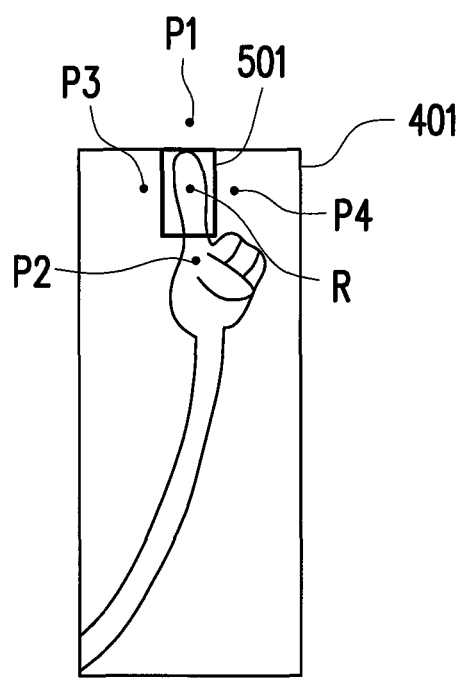
FIG. 5 is a schematic diagram of a hand region according to an embodiment of the invention.

Then, the fingertip detection module 340 may further perform an opening operation with a 3×3 square structuring element, so as to make a shape of the fingertip candidate region more smooth and remove the noise. For the subsequent operations, a bounding box is used to indicate the fingertip candidate region. For example, FIG. 5 is a schematic diagram of a hand region according to an embodiment of the invention. With reference to FIG. 5, in terms of the hand region 401 of FIG. 4, after detecting a possible profile of the finger, the bounding box circles the detected possible profile of the finger, so as to obtain a fingertip candidate region 501.

The correct fingertip region may be successfully obtained by the aforementioned operation. However, in order to exclude any non-fingertip region, non-fingertip region may be further eliminated by using depth information of the image. A depth map is generated with respect to the image. The purpose of the depth map is to make sure whether a pixel belongs to a foreground. For instance, in the depth map, a depth value of a pixel that belongs to the background is 0; a depth value of a pixel covered by the body mask established by the hand detection module 330 is 0; and a depth value of a pixel that is not covered by the body mask established by the hand detection module 330 is larger than 0. That is to say, in the depth map, the depth value of the pixel that belongs to the background is reset to zero, and the depth value of the pixel belonging to the foreground is larger than 0.

After obtaining the depth information, the fingertip detection module 340 utilizes the depth value to exclude the non-fingertip region. The following is described with reference to FIG. 5. First, a center point of the fingertip candidate region 501 is obtained to serve as a reference point R. Then, a first side point P1, a second side point P2, a third side point P3, and a fourth side point P4 are respectively obtained in four directions (up, down, left, right) of the reference point R. Here, the first side point P1, the second side point P2, the third side point P3, and the fourth side point P4 are respectively outside the fingertip candidate region 501.

It is given that H and W respectively represent a height and width of the fingertip candidate region 501. The first side point P1 and the second side point P2 are respectively set to be 0.75×H above and below the reference point R. Moreover, the third side point P3 and the fourth side point P4 are respectively set to be 0.9×W on the left and on the right of the reference point R. The aforementioned 0.75×H and 0.9×W are merely examples. In other embodiments, the first side point P1, the second side point P2, the third side point P3, and the fourth side point P4 may be at other positions as long as they are outside the fingertip candidate region 501.

After obtaining the four side points, a first depth value, a second depth value, a third depth value, and a fourth depth value of the first side point P1, the second side point P2, the third side point P3, and the fourth side point P4 are respectively obtained from the depth information (the aforementioned depth map). Next, whether the first depth value, the second depth value, the third depth value, and the fourth depth value are respectively larger than 0 is determined. If only one of the first depth value, the second depth value, the third depth value, and the fourth depth value is larger than 0, it is determined that the fingertip candidate region 501 and the hand region are connected. Furthermore, in the depth map that has been processed, a depth value of a pixel of a background object is reset to zero, and the remaining pixels (of a foreground object) has a depth value larger than 0. Since the first side point P1, the second side point P2, the third side point P3, and the fourth side point P4 have been processed, if only one of the four side points belongs to the foreground object, namely, only one of the four depth values is larger than 0, it is determined that the fingertip candidate region 501 is connected with the hand region. In other situations, it is determined that the fingertip candidate region 501 is not connected with the hand region.

Figure 6A:
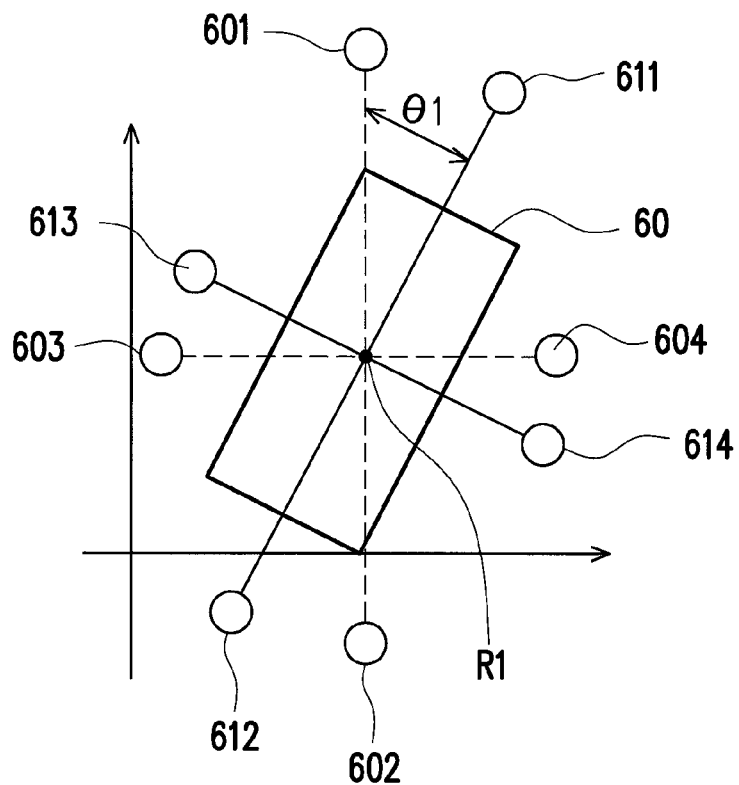
FIG. 6A and FIG. 6B are schematic diagrams illustrating a method of determining a target fingertip region according to an embodiment of the invention.
Figure 6B:
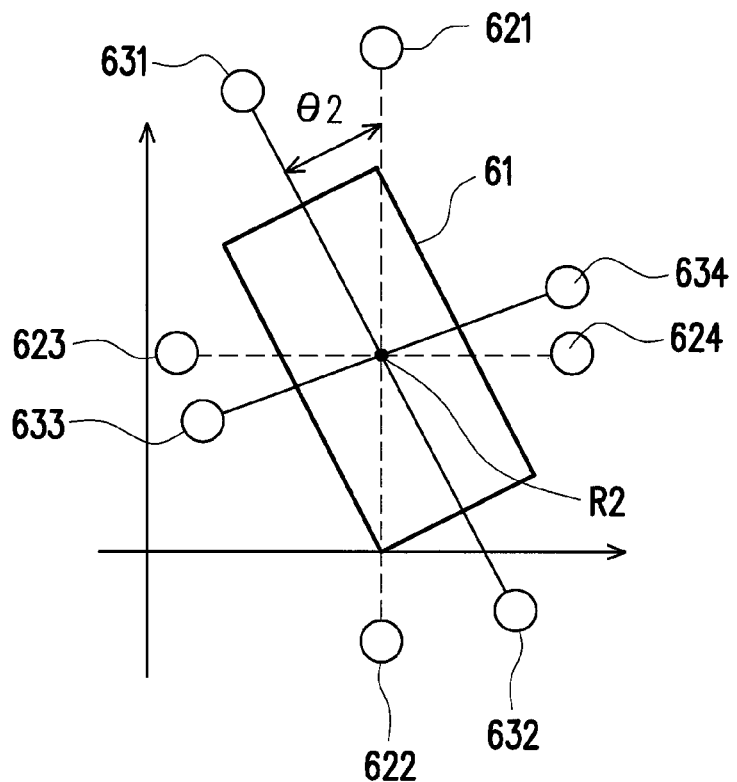

In addition, the finger of the user may not always be upright and may be tilt in other situations. Thus, after obtaining the four side points with respect to the center point, the four side points may be further rotated clockwise or counterclockwise. Then, whether the fingertip candidate region is connected with the hand region is determined according to the depth values of the four side points after the four side points are rotated. For instance, FIG. 6A and FIG. 6B are schematic diagrams illustrating a method of determining a target fingertip region according to an embodiment of the invention. FIG. 6A illustrates a situation of clockwise rotation while FIG. 6B illustrates a situation of counterclockwise rotation.

In FIG. 6A, a center point of a fingertip candidate region 60 is found to serve as a reference point R1. Then, a first side point 601, a second side point 602, a third side point 603, and a fourth side point 604 are respectively obtained outside the fingertip candidate region 60 in four directions (up, down, left, right) of the reference point R1. Thereafter, the first side point 601, the second side point 602, the third side point 603, and the fourth side point 604 are rotated clockwise for an angle θ1 to obtain new first side point 611, new second side point 612, new third side point 613, and new fourth side point 614. Then, if only one of the first side point 611, the second side point 612, the third side point 613, and the fourth side point 614 has a depth value larger than 0, it is determined that the fingertip candidate region 60 and the hand region are connected.

Likewise, in FIG. 6B, a center point of a fingertip candidate region 61 is found to serve as a reference point R2. A first side point 621, a second side point 622, a third side point 623, and a fourth side point 624 are respectively obtained outside the fingertip candidate region 61 in four directions (up, down, left, right) of the reference point R2. Next, the first side point 621, the second side point 622, the third side point 623, and the fourth side point 624 are rotated counterclockwise for an angle θ2 to obtain new first side point 631, new second side point 632, new third side point 633, and new fourth side point 634. Then, if only one of the first side point 631, the second side point 632, the third side point 633, and the fourth side point 634 has a depth value larger than 0, it is determined that the fingertip candidate region 61 and the hand region are connected.

The fingertip tracking module 350 executes a fingertip tracking process, so as to track the finger of the user. For example, first, the fingertip tracking module 350 utilizes a corner detection to effectively find a plurality of favorable characteristic points in the target fingertip region. In order to accurately analyze a movement of the user's fingertip, a centroid of the plurality of characteristic points is used as a tracking point. The aforementioned corner detection is a method for capturing characteristic and inferring image content in a computer vision system. Generally, the corner detection is used for motion detection, image registration, video tracking, and object recognition, etc.

Then, the fingertip tracking module 350 executes a dynamic tracking algorithm of consecutive images, e.g. optical flow. Here, a Lucas-Kanade tracking method is used to estimate a variation of the optical flow, and an image pyramid concept is used to extend the Lucas-Kanade tracking method. With use of the image pyramid concept, it is possible to analyze faster movement and obtain a more accurate offset.

The click event identification module 360 executes a click event identification process thereby determining whether the user triggers a specific function. Generally speaking, if the user intends to press a function item in the display unit 130 in the three-dimensional space with the finger, the user's actions may be divided into the following two types. A first action is that the finger of the user does not move substantially in the up, down, left, and right directions, but moves forward. A second action is that a difference between a depth value of a top pixel of the fingertip and a depth value of a bottom pixel of the fingertip is larger than a threshold value.

More specifically, the click event identification module 360 obtains a first tracking point in the target fingertip region of the image that is currently received. Next, whether a display position in the display unit 130, which corresponds to the first tracking point, is at a position of the function item is determined. If the display position corresponding to the first tracking point is at the position of the function item, the click event identification module 360 obtains a second tracking point in the target fingertip region of the image that is previously received. Following that, the first tracking point and the second tracking point are compared to determine whether the click event occurs. For example, the first tracking point and the second tracking point are compared to obtain a displacement in a vertical axis or a horizontal axis, and the first tracking point and the second tracking point are compared to obtain a depth variation according to the depth information.

If the displacement in the vertical axis between the tracking points of the current and the previous images is less than a first predetermined value and the displacement in the horizontal axis is less than a second predetermined value, and the depth variation between the tracking points of the current and the previous images is less than a third predetermined value, the click event identification module 360 determines that the click event occurs. On the other hand, if at least one of the following three conditions exists, namely, the displacement in the vertical axis is larger than or equal to the first predetermined value, the displacement in the horizontal axis is larger than or equal to the second predetermined value, and the depth variation is larger than or equal to the third predetermined value, the click event identification module 360 determines that the click event does not occur. For example, whether the click event occurs is determined by the following equation (3).

$$ClickEvent1 = \begin{cases} \text{fasle}, & |X\_old - X\_new| \geq 10(\text{pixel}) \\ \text{fasle}, & |Y\_old - Y\_new| \geq 10(\text{pixel}) \\ \text{false}, & |d\_old - d\_new| \geq 0.5(\text{cm}) \\ \text{true}, & \text{otherwise} \end{cases} \quad (3)$$

Here, (X_old, Y_old) represents coordinates of the second tracking point of the previously received image; (X_new, Y_new) represents coordinates of the first tracking point of the currently received image; |X_old−X_new| represents the displacement in the horizontal axis; and |Y_old−Y_new| represents the displacement in the vertical axis. In addition, d_old represents the depth value of the second tracking point of the previously received image; d_new represents the depth value of the first tracking point of the currently received image; and |d_old-d_new| represents the depth variation. The first predetermined value, the second predetermined value, and the third predetermined value are 10 pixels, 10 pixels, and 0.5 cm respectively.

Figure 7:
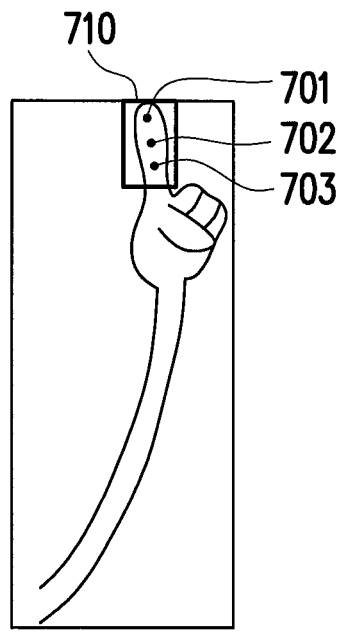
FIG. 7 is a schematic diagram illustrating determining a click event according to an embodiment of the invention.

Moreover, in the step of determining whether the click event occurs, two calculation points of the current image may further serve as a basis for determining whether the click event occurs. For example, FIG. 7 is a schematic diagram illustrating determining a click event according to an embodiment of the invention. FIG. 7 depicts a hand region in the currently received image. After obtaining a target fingertip region 710, the fingertip tracking module 350 is used to obtain a first tracking point 702. Thereafter, two calculation points are obtained respectively above and below the first tracking point 702 to serve as a first calculation point 701 and a second calculation point 703. More specifically, the first tracking point 702 is located between the first calculation point 701 and the second calculation point 703. Next, the click event identification module 360 calculates a depth difference between the first calculation point 701 and the second calculation point 703 according to the depth information. If the depth difference is larger than or equal to a fourth predetermined value, it is determined that the click event occurs. If the depth difference is less than the fourth predetermined value, it is determined that the click event does not occur. For example, whether the click event occurs is determined by the following equation (4).

$$ClickEvent2 = \begin{cases} true, & d\_down - d\_up \geq 1.2 \text{(cm)} \\ fasle, & otherwise \end{cases} \quad (4)$$

Here, d_down represents the depth value of the second calculation point 703 below the first tracking point 702, and d_up represents the depth value of the first calculation point 701 above the first tracking point 702. Here the fourth predetermined value is 1.2 cm, for example.

In addition, it is worth mentioning that the equations (3) and (4) may be combined to determine whether the click event occurs. For example, in a situation that the displacement in the vertical axis between the tracking points of the current and the previous images is less than the first predetermined value, the displacement in the horizontal axis is less than the second predetermined value, and the depth variation is less than the third predetermined value, it is determined that the click event occurs only if the depth difference between the first calculation point 701 and the second calculation point 703 in the current image is larger than or equal to the fourth predetermined value. That is to say, in a situation that the displacement in the vertical axis (|Y_old–Y_new|) is less than 10 pixels, the displacement in the horizontal axis (|X_old–X_new|) is less than 10 pixels, and the depth variation (|d_old–d_new|) is less than 0.5 cm, it is determined that the click event occurs only if the depth difference (d_down–d_up) is larger than or equal to 1.2 cm.

After the click event identification module 360 determines that the click event occurs, the processing unit 120 executes the corresponding function.

The aforementioned embodiment is applicable not only to one user. If there are multiple people in the image capturing range of the image capturing unit 110, the aforementioned embodiment may be adapted for one single user after proper processing. To be more specific, in the situation that there are multiple people in the image, in order to distinguish uninterested objects to obtain a possible human object in the scene, the background removal module 310 further detects a plurality of pending objects (e.g. multiple portrait regions) in the image and excludes the uninterested objects from the pending objects according to the depth information of the image. Here, a depth threshold value may be set to exclude the uninterested objects (e.g. users that are too far away). For instance, it is given that the depth threshold value is 150 cm, and the image includes three pending objects A, B, and C which respectively have depth values of 160 cm, 110 cm, and 140 cm. Accordingly, the background removal module 310 excludes the pending object A with depth value larger than a predetermined depth value and retains the pending objects B and C with depth values less than the predetermined depth value.

Then, when the face pose estimation module 320 executes the face pose estimation process, the face pose estimation module 320 executes the face detection process on the retained pending objects B and C, so as to obtain a plurality of face regions and obtain a target face region from the face regions according to the depth information of the image. The target face region has the minimum depth value among the depth values of the face regions. That is, the face region of the user that is closer to the image capturing unit 110 has a smaller depth value. Next, the face pose estimation module 320 retains the pending object B located in the target face region that has the minimum depth value and excludes the pending object C. In other words, the pending object in the image corresponding to the user that is closest to the image capturing unit 110 is retained. Here, the image capturing unit 110 is disposed near the display unit 130.

Moreover, it is worth mentioning that the aforementioned embodiment may be further combined with an augmented reality interactive interface, through which the user is able to interact with a computer in the three-dimensional space by means of finger detection.

Figure 8A:
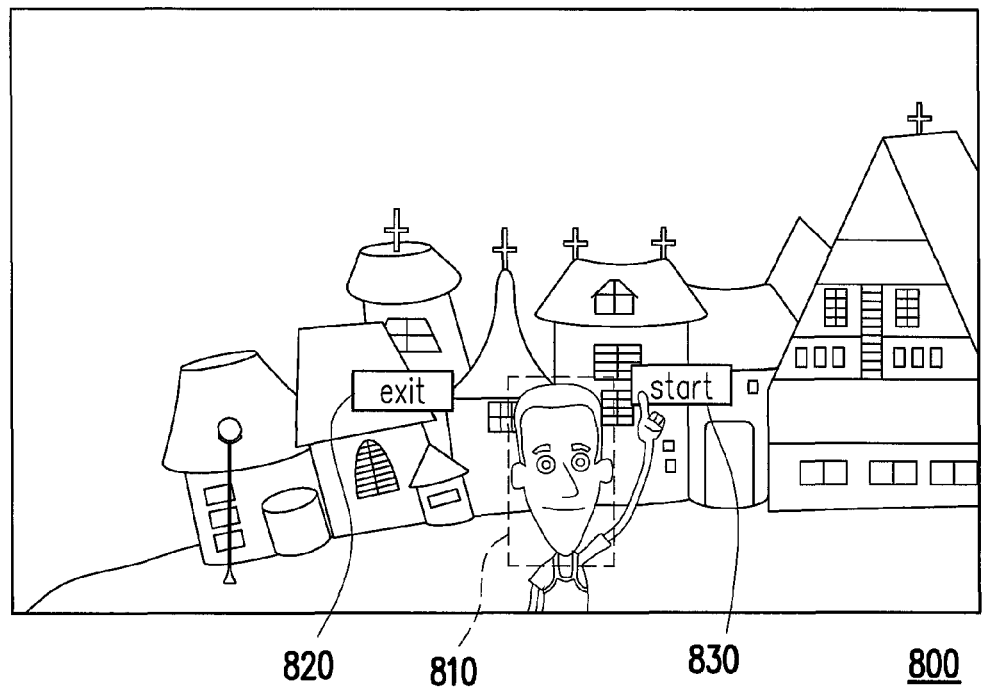
FIG. 8A and FIG. 8B are schematic diagrams illustrating an operation method of a combined augmented reality interactive interface according to an embodiment of the invention.
Figure 8B:
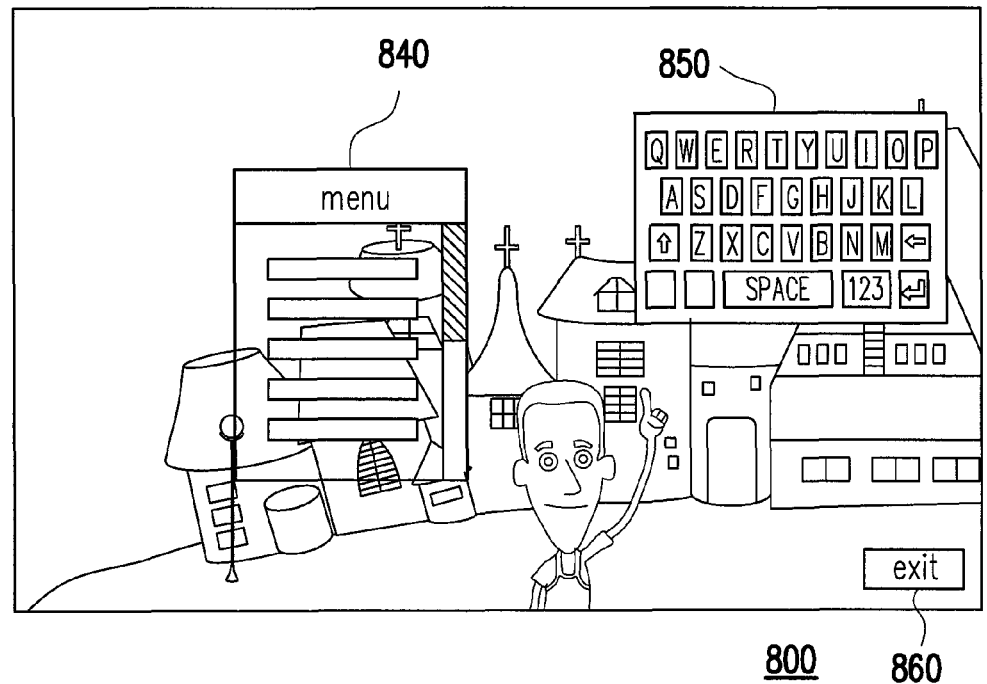

For instance, FIG. 8A and FIG. 8B are schematic diagrams illustrating an operation method of a combined augmented reality interactive interface according to an embodiment of the invention. The following is described with reference to FIG. 1. In FIG. 8A, an augmented reality interactive interface 800 is displayed in the display unit 130. The augmented reality interactive interface 800 displays an image that is currently received by the image capturing unit 110. For example, the image capturing unit 110 is arranged to face the user for capturing the image and is disposed near the position of the display unit 130 (e.g. above the display unit 130). When the user exists in the image capturing range of the image capturing unit 110, a live image presented by the augmented reality interactive interface 800 of FIG. 8A simultaneously displays the user. Accordingly, the user is able to operate the augmented reality interactive interface 800 while watching the portrait displayed in the augmented reality interactive interface 800. Regarding identification of the user's finger and determination of the click event, please refer to the above descriptions about the image processing module 300 of FIG. 3. The same descriptions will not be repeated hereinafter.

When a target face region 810 is obtained in the image, as shown in FIG. 8A, the augmented reality interactive interface 800 displays a first virtual layer, wherein the first virtual layer includes at least one function item. In this embodiment, the first virtual layer includes two function items 820 and 830. The function item 830 is used to open a second virtual layer, and the function item 820 is used to exit the first virtual layer.

When the function item 830 is triggered, as shown in FIG. 8B, the augmented reality interactive interface 800 displays the second virtual layer, wherein the second virtual layer includes at least one virtual control interface. In FIG. 8B, the second virtual layer includes two virtual control interfaces 840 and 850 and a function item 860. The virtual control interface 840 is a menu, for example. The virtual control interface 850 is a virtual keyboard. The function item 860 is used to exit the second virtual layer or directly close the augmented reality interactive interface 800. The positions of the aforementioned virtual control interfaces 840 and 850 as shown in the figures are merely examples. Thus, the invention is not limited thereto.

Accordingly, when the user watches the portrait corresponding to the augmented reality interactive interface 800 to operate the electronic apparatus 100 in the three-dimensional space, the image processing module 300 tracks the movement of the user's finger to determine whether the user's action meets the defined condition of the click event (e.g. the aforementioned equations (3) and (4)), thereby determining whether the user intends to operate the virtual control interface 840 or 850 or to click the function item 860.

For example, the user moves the finger in the three-dimensional space and learns from the augmented reality interactive interface 800 that the position of the finger of the portrait in the image corresponds to the position of the function item 860. Then, the user stops moving the finger and executes a click gesture in the three-dimensional space. Thus, the image processing module 300 determines that the click event occurs, and consequently the augmented reality interactive interface 800 of FIG. 8B returns to the first virtual layer shown in FIG. 8A or the augmented reality interactive interface 800 is closed directly (depending on the function set to the function item 860). The user may also operate the virtual control interface 840 or the virtual control interface 850 in a manner similar to the aforementioned.

In conclusion of the above, the above embodiments provide an interactive method for obtaining the command transmitted by the user's finger in the three-dimensional space through analyzing the image captured by the image capturing unit, so that the user is able to interact with the electronic apparatus. Accordingly, the user does not need to wear any auxiliary equipment, such as putting a color marker on the user's hand or wearing a data glove, and can interact with the electronic apparatus with the finger. In addition, the above embodiments are readily operable in the natural environment without setting the position of somatosensory equipment in advance or limiting the surroundings of the user. Moreover, the augmented reality interactive interface may be integrated for the user to perform interactive operation with the electronic apparatus more easily.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:

1. An interactive operation method of an electronic apparatus, the interactive operation method comprising:
    capturing an image sequence by an image capturing unit;
    executing an image pre-processing on an image of the image sequence;
    obtaining a fingertip candidate region from the image;
    determining whether the fingertip candidate region is connected with a hand region;
    designating the fingertip candidate region as a target fingertip region if the fingertip candidate region is connected with the hand region;
    determining whether a click event occurs by continuously tracking the target fingertip region; and
    executing a corresponding function in the electronic apparatus when the click event occurs, wherein the step of determining whether the fingertip candidate region is connected with the hand region comprises:
        obtaining a center point of the fingertip candidate region as a reference point;
        obtaining a first side point, a second side point, a third side point, and a fourth side point respectively in four directions of the reference point, wherein the first side point, the second side point, the third side point, and the fourth side point are located outside the fingertip candidate region;
        obtaining a first depth value, a second depth value, a third depth value, and a fourth depth value of the first side point, the second side point, the third side point, and the fourth side point respectively from depth information of the image;
        determining whether the first depth value, the second depth value, the third depth value, and the fourth depth value are larger than 0;
        determining that the fingertip candidate region is connected with the hand region in a situation that only one of the first depth value, the second depth value, the third depth value, and the fourth depth value is larger than 0; and
        determining that the fingertip candidate region is not connected with the hand region in other situations.

2. The interactive operation method according to claim 1, further comprising:
    obtaining a first tracking point in the target fingertip region of the image that is currently received;
    determining whether a display position in a display unit, which corresponds to the first tracking point, is at a position of a function item; and
    if the display position corresponding to the first tracking point is at the position of the function item, the interactive operation method comprising:
        obtaining a second tracking point in the target fingertip region of the image that is previously received; and
        comparing the first tracking point and the second tracking point to determine whether the click event occurs.

3. The interactive operation method according to claim 2, wherein a step of comparing the first tracking point and the second tracking point to determine whether the click event occurs comprises:
    comparing the first tracking point and the second tracking point to obtain a displacement in a vertical axis;
    comparing the first tracking point and the second tracking point to obtain a displacement in a horizontal axis;
    comparing the first tracking point and the second tracking point to obtain a depth variation according to depth information;
    determining that the click event occurs if the displacement in the vertical axis is less than a first predetermined value, the displacement in the horizontal axis is less than a second predetermined value, and the depth variation is less than a third predetermined value; and
    determining that the click event does not occur if at least one of the following three conditions exists, namely, the displacement in the vertical axis is larger than or equal to the first predetermined value, the displacement in the horizontal axis is larger than or equal to the second predetermined value, and the depth variation is larger than or equal to the third predetermined value.

4. The interactive operation method according to claim 3, wherein a step of determining whether the click event occurs further comprises:
    obtaining a first calculation point and a second calculation point in the target fingertip region of the image that is currently received based on the first tracking point, wherein the first tracking point is located between the first calculation point and the second calculation point;
    calculating a depth difference between the first calculation point and the second calculation point according to the depth information;
    in a situation that the displacement in the vertical axis is less than the first predetermined value, the displacement in the horizontal axis is less than the second predetermined value, and the depth variation is less than the third predetermined value, determining that the click event occurs if the depth difference is larger than or equal to a fourth predetermined value; and
    determining that the click event does not occur if the depth difference is less than the fourth predetermined value.

5. The interactive operation method according to claim 1, wherein a step of executing the image pre-processing comprises:
    executing a background removal process, comprising:
        detecting a plurality of pending objects in the image; and
        excluding one or a plurality of uninterested objects from the plurality of pending objects according to depth information of the image, wherein a depth value of the one or the plurality of uninterested objects is larger than a predetermined depth value.

6. The interactive operation method according to claim 5, further comprising the following after a step of executing the background removal process:
   executing a face pose estimation process, comprising:
      executing a face detection process on the remaining pending objects to obtain a plurality of face regions;
      obtaining a target face region from the plurality of face regions according to the depth information of the image, wherein the target face region has the minimum depth value among the depth values of the face regions; and
      retaining one of the pending objects located in the target face region that has the minimum depth value and excluding the other pending objects.

7. The interactive operation method according to claim 6, further comprising the following after a step of executing the face pose estimation process:
   executing a hand detection process, comprising:
      obtaining the hand region by a skin color detection algorithm.

8. The interactive operation method according to claim 7, further comprising the following after a step of executing the hand detection process:
   executing a fingertip detection process to obtain the fingertip candidate region.

9. The interactive operation method according to claim 1, further comprising:
   displaying an augmented reality interactive interface in a display unit;
   displaying the image that is received in the augmented reality interactive interface;
   displaying a first virtual layer in the augmented reality interactive interface when obtaining a target face region in the image, wherein the first virtual layer comprises a function item; and
   displaying a second virtual layer in the augmented reality interactive interface when the function item is triggered, wherein the second virtual layer comprises a virtual control interface.

* * * * *